(12) United States Patent
Shimada

(10) Patent No.: US 7,258,827 B2
(45) Date of Patent: Aug. 21, 2007

(54) METHOD FOR EXTRUDING UNVULCANIZED RUBBER

(75) Inventor: Go Shimada, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 263 days.

(21) Appl. No.: 11/039,839

(22) Filed: Jan. 24, 2005

(65) Prior Publication Data

US 2005/0121823 A1   Jun. 9, 2005

Related U.S. Application Data

(62) Division of application No. 10/092,755, filed on Mar. 8, 2002, now Pat. No. 6,875,004.

(30) Foreign Application Priority Data

Mar. 12, 2001   (JP)   ............... 2001-069154

(51) Int. Cl.
   B29C 47/06   (2006.01)
   B29C 47/12   (2006.01)

(52) U.S. Cl. .................. 264/173.12; 264/173.17; 264/174.11

(58) Field of Classification Search ........... 264/173.12, 264/173.17, 174.11
   See application file for complete search history.

(56) References Cited

U.S. PATENT DOCUMENTS

| | | |
|---|---|---|
| 3,398,431 A | 8/1968 | Corbett |
| 4,552,521 A | 11/1985 | Linnstaedter |
| 4,556,376 A | 12/1985 | Sievers et al. |
| 4,653,994 A | 3/1987 | Capelle |
| 4,683,095 A | 7/1987 | Tolonen et al. |
| 4,731,004 A | 3/1988 | Wenz, Jr. |
| 5,154,870 A | 10/1992 | Urui et al. |
| 6,294,119 B1 | 9/2001 | Nakamura |
| 2006/0157177 A1* | 7/2006 | Shimada et al. ....... 264/174.11 |

FOREIGN PATENT DOCUMENTS

| | | | |
|---|---|---|---|
| DE | 35 34 734 A1 | | 4/1987 |
| JP | 04-208443 | * | 7/1992 |
| JP | 11-20426 | | 1/1999 |
| JP | A 11-240081 | | 9/1999 |
| JP | A 2000-117813 | | 4/2000 |
| JP | A 2000-351145 | | 12/2000 |

OTHER PUBLICATIONS

Machine translation for JP 2000-117813, no date.
Machine translation for JP 2000-351145, no date.
Machine translation for JP 11-20426, no date.

* cited by examiner

Primary Examiner—Steven D. Maki
(74) Attorney, Agent, or Firm—Oliff & Berridge, PLC

(57) ABSTRACT

A method and apparatus for extruding unvulcanized rubber in a tire production process, in which an unvulcanized rubber extruded member can be formed by extrusion. An extruded rubber member having a cross section in which a portion of a second unvulcanized rubber intrudes between portions of a first unvulcanized rubber is formed by extrusion. The apparatus includes a first passage for the first unvulcanized rubber, a second passage for the second unvulcanized rubber, and a flow dividing mechanism where the first and second passages are adjacent or connected, which separates a portion of the first unvulcanized rubber passing through the first passage such that the first unvulcanized rubber is disposed at both sides of the intruded second unvulcanized rubber. In the method, the first unvulcanized rubber is divided into two flows, and a portion of the second unvulcanized rubber is caused to intrude therebetween.

6 Claims, 8 Drawing Sheets

F I G. 2
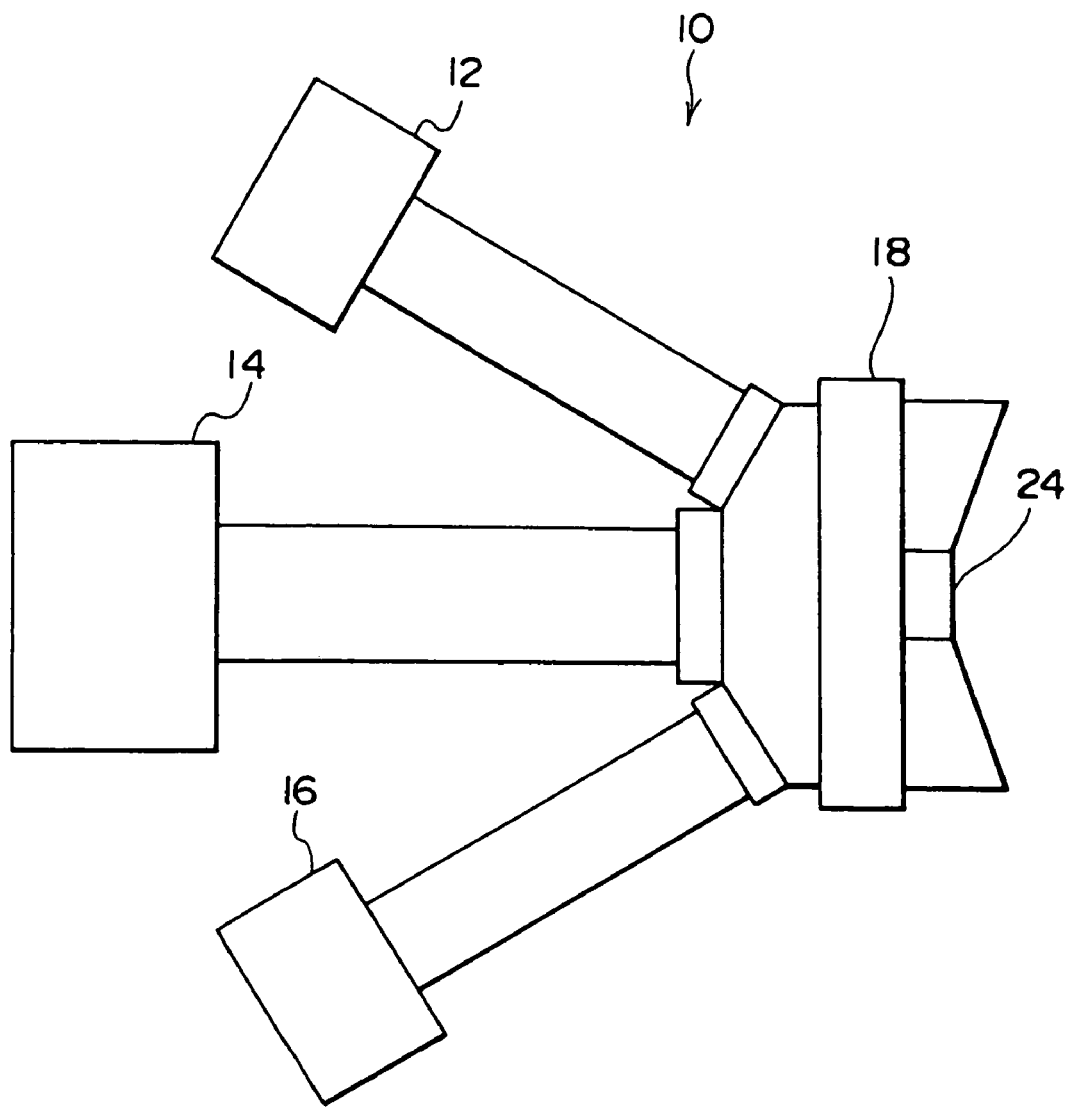

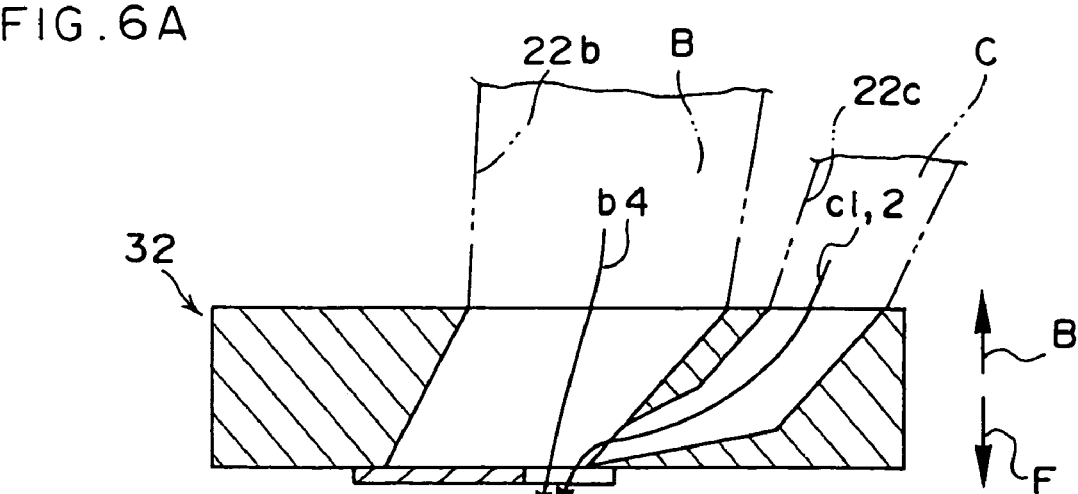
FIG. 6A
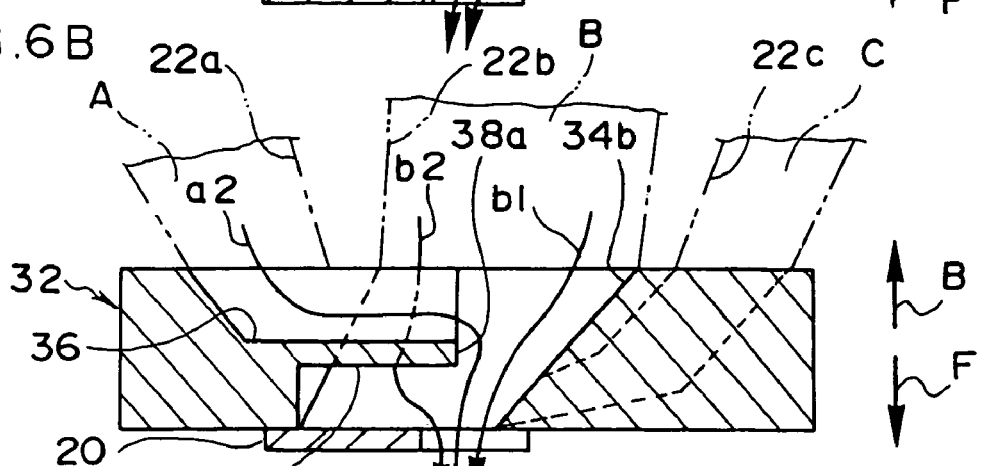
FIG. 6B
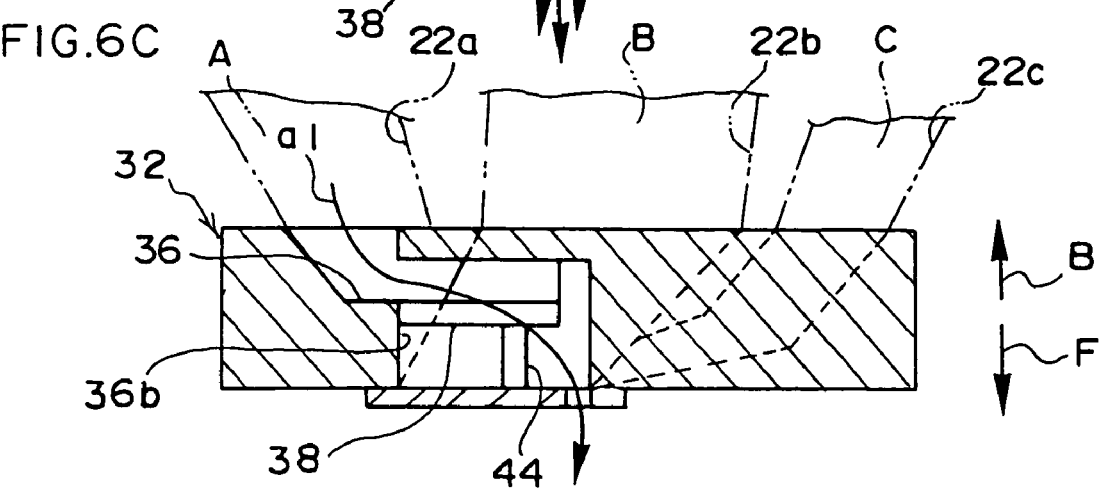
FIG. 6C
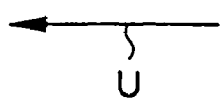
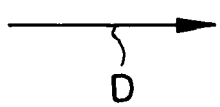

METHOD FOR EXTRUDING UNVULCANIZED RUBBER

This is a Division of application Ser. No. 10/092,755 filed Mar. 8, 2002, now U.S. Pat. No. 6,875,004, which claims priority from JP 2001-069154, filed Mar. 12, 2001. The entire disclosures of the prior applications are hereby incorporated by reference herein in their entireties.

BACKGROUND OF THE INVENTION

1. Field of the Invention

The present invention relates to a method and apparatus for extruding unvulcanized rubber, in which an unvulcanized rubber member comprised of at least two kinds of unvulcanized rubbers is extruded.

2. Description of the Related Art

In an automobile pneumatic tire, there are some cases in which a rubber chafer comprised of hard rubber may be provided at the outer side of a tire bead portion so as to increase rigidity of the bead portion.

An upper end of the rubber chafer is connected to a side-wall rubber layer which forms a side wall of the tire.

However, there are cases in which, because the bead portion is repeatedly subjected to bending deformation when the vehicle is running, the rubber chafer and the side-wall rubber layer are separated from each other.

In order to solve the aforementioned problem, it has been considered that an area in which the rubber chafer and the side-wall rubber layer are connected can be increased, and a pneumatic tire having a cross sectional configuration as shown in FIG. 7 has been proposed.

In the pneumatic tire having the cross sectional configuration shown in FIG. 7, an inner portion 106A provided at a radial-direction inner side of a side-wall rubber layer 106 which forms a side wall 104, and an outer portion 106B provided at an outer side of the side-wall rubber layer 106 are formed so as to cover inner and outer surfaces, in an axial direction of the tire, of a rubber chafer 102 tapered in an upward direction, and an area in which the side-wall rubber layer 106 and the rubber chafer 102 are connected is increased so as to strengthen the junction between the side-wall rubber layer 106 and the rubber chafer 102.

In order to manufacture such a pneumatic tire, in a process for producing a green tire, a rubber extruded member 108 in which the unvulcanized side-wall rubber layer 106 and the unvulcanized rubber chafer 102 having the cross sectional configuration as shown in FIG. 8 are integrated with each other is produced. Thereafter, a rubber sheet 110 comprised of unvulcanized rubber of the same kind as the side-wall rubber layer 106 is adhered so as to cover a region of the rubber extruded member 108 in the vicinity of the end of the rubber chafer 102.

The rubber extruded member 108 with the rubber sheet 110 adhered thereto is applied to an outer surface of a carcass of a tire case in a production process. Thus, the pneumatic tire is manufactured.

However, there conventionally existed a problem that equipment for adhering the rubber sheet 110 or a process for adhering the sheet may be required, and equipment investment and stock handling of the rubber sheet 10 may also increase.

Further, because the thick rubber sheet 110 is adhered to the rubber extruded member 108, a stepped portion 112 is formed on the surface of the rubber extruded member 108, as shown in FIG. 8. For this reason, air in the stepped portion 112 may cause bare. Moreover, losses due to spoiled products caused by incorrect setting may also increase.

SUMMARY OF THE INVENTION

An object of the present invention is to provide a method and apparatus for extruding unvulcanized rubber, in which equipment investment for tires is held down, the number of manufacturing steps is not increased, and an unvulcanized rubber extruded member from which a high quality tire is produced can be formed by extrusion.

A first aspect of the present invention is an apparatus for extruding unvulcanized rubber which comprises a first extruder main body for extruding a first unvulcanized rubber, a second extruder main body for extruding a second unvulcanized rubber, an extrusion head which connects a leading end of the first extruder main body and the second extruder main body, and a passage-forming die for guiding, at a leading end of the extrusion head, the first unvulcanized rubber and the second unvulcanized rubber toward a die plate having an opening, wherein an extruded rubber member is formed by extrusion, the extruded rubber member having a cross sectional configuration in which, when seen from a cross section perpendicular to a direction in which the extruded rubber member is extruded, a portion of the second unvulcanized rubber intrudes into the first unvulcanized rubber and a portion of the first unvulcanized rubber is disposed at both sides of the intruded second unvulcanized rubber in a direction intersecting a direction in which the second unvulcanized rubber intrudes, the apparatus comprising: a first passage through which the first unvulcanized rubber passes; a second passage provided adjacent to or connected to the first passage and making the second unvulcanized rubber to pass therethrough; and a flow dividing mechanism provided at one of a portion at which the first passage and the second passage are disposed adjacently and a portion at which these passages are connected, and separating a portion of the first unvulcanized rubber passing through the first passage to allow the first unvulcanized rubber to be disposed at both sides of the intruded second unvulcanized rubber in a direction intersecting a direction in which the second unvulcanized rubber intrudes.

In the apparatus for extruding unvulcanized rubber, the first unvulcanized rubber and the second unvulcanized rubber are each delivered to the passage-forming die by using the first extruder main body and the second extruder main body, respectively.

The first unvulcanized rubber passes through the first passage formed in the passage-forming die and the second unvulcanized rubber passes through the second passage formed in the passage-forming die.

The flow dividing mechanism provided between the first passage and the second passage divides a portion of the flowing first unvulcanized rubber passed through the first passage so that the first unvulcanized rubber is disposed in the extruded rubber member at both sides of the intruded second unvulcanized rubber in a direction intersecting a direction in which the second unvulcanized rubber intrudes.

As a result, the extruded rubber member is readily obtained by one extrusion process, and the member has a cross sectional configuration in which, when seen in a cross section perpendicular to a direction in which the extruded rubber member is extruded, at a boundary portion between the first unvulcanized rubber and the second unvulcanized rubber, a portion of the second unvulcanized rubber intrudes into the first unvulcanized rubber, and a portion of the first unvulcanized rubber is disposed at both sides of the intruded second unvulcanized rubber in a direction intersecting a direction in which the second unvulcanized rubber intrudes.

In the apparatus for extruding unvulcanized rubber of the present invention, preferably, the flow dividing mechanism includes a first weir disposed at an upstream side of the die plate and apart from the die plate, and protruding from the second passage side toward the first passage in a direction perpendicular to a direction in which the unvulcanized rubbers pass.

In the aforementioned apparatus for extruding unvulcanized rubber, the weir formed so as to protrude from the second passage toward the first passage in a direction perpendicular to a direction in which unvulcanized rubber passes is provided at the upstream side of the die plate and apart from the die plate. For this reason, the direction in which a portion of the first unvulcanized rubber passes through the first passage can be changed so that the portion of the first unvulcanized rubber rides over a protruding end of the weir, and the direction in which the other portion of the first unvulcanized rubber flows can be changed so that the other portion of the first unvulcanized rubber flows laterally around the weir in a direction perpendicular to a direction in which the weir protrudes.

As a result, the portion of the first unvulcanized rubber is disposed at one side of the intruded second unvulcanized rubber in the direction in which the second unvulcanized rubber intrudes, and the other portion of the first unvulcanized rubber is disposed at another side of the intruded second unvulcanized rubber.

A second aspect of the present invention is a method for extruding unvulcanized rubber, in which an extruded rubber member is formed by extrusion by an extruding apparatus, the extruded rubber member having a cross sectional configuration in which a portion of the second unvulcanized rubber intrudes into the first unvulcanized rubber and a portion of the first unvulcanized rubber is disposed at both sides of the intruded second unvulcanized rubber in a direction intersecting a direction in which the second unvulcanized rubber intrudes, the method comprising the steps of: dividing a portion of the flowing first unvulcanized rubber into two flows at an upstream side of a die plate including an opening in the extruding apparatus; allowing a portion of the second unvulcanized rubber to intrude in between the two flows into which the portion of the first unvulcanized rubber is divided; and extruding, from the opening of the die plate, an extruded rubber member in which the first unvulcanized rubber and the second unvulcanized rubber are integrated with each other.

In the method for extruding unvulcanized rubber, a portion of the flowing first unvulcanized rubber is divided into two parts at the upstream side of the die plate having the opening for the extruding apparatus, and a portion of the second unvulcanized rubber is caused to intrude in between the two divided flows of the first unvulcanized rubber. Thereafter, the first unvulcanized rubber and the second unvulcanized rubber are integrated with each other and an extruded rubber member having the first and second unvulcanized rubbers integrated is extruded from the opening of the die plate.

In the aforementioned method for extruding unvulcanized rubber of the present invention, preferably, the extruding apparatus includes a flow dividing mechanism including a first weir which is provided at the upstream side of the die plate and apart from the die plate and which protrudes in a direction perpendicular to a direction in which the first unvulcanized rubber passes, the first unvulcanized rubber and the second unvulcanized rubber are caused to intersect with each other by allowing the second unvulcanized rubber to pass over the first weir.

Further, preferably, the flow dividing mechanism includes a second weir extending from the first weir to the die plate, and the position of one of leading ends of two divided flows of the first unvulcanized rubber disposed at both sides of the second unvulcanized rubber is changed by the position of the second weir.

Moreover, the aforementioned method, preferably, further comprises a step of: causing a portion of a third unvulcanized rubber to intrude into the first unvulcanized rubber, and an extruded rubber member having a region in which the first unvulcanized rubber and the third unvulcanized rubber are integrated with each other is extruded from the opening of the die plate.

BRIEF DESCRIPTION OF THE DRAWINGS

FIG. 2 is a side view which schematically shows structure of an unvulcanized rubber extruding apparatus.

FIG. 6A is a cross sectional view taken along the line 6(A)-6(A) of the passage-forming die shown in FIG. 1A.

FIG. 6B is a cross sectional view taken along the line 6(B)-6(B) of the passage-forming die shown in FIG. 1A.

FIG. 6C is a cross sectional view taken along the line 6(C)-6(C) of the passage-forming die shown in FIG. 1A.

DESCRIPTION OF THE PREFERRED EMBODIMENTS

An embodiment of an unvulcanized rubber extruding apparatus of the present invention will be described hereinafter with reference to FIGS. 1 to 6.

As shown in FIG. 2, the unvulcanized rubber extruding apparatus 10 has three extruder main bodies 12, 14 and 16, and an extrusion head 18 to which ends of the extruder main bodies 12, 14 and 16 are connected.

The extruder main bodies 12, 14 and 16 each include a hopper (not shown) for supplying unvulcanized rubber, and three kinds of unvulcanized rubbers A, B and C having different compositions are continuously supplied from the hoppers to the extruder main bodies 12, 14 and 16, respectively. The supplied unvulcanized rubbers A, B and C are each kneaded by screws (not shown) driven to rotate within the extruder main bodies 12, 14 or 16. As a result, the unvulcanized rubbers A, B and C are caused to flow toward the extrusion head 18 while exhibiting enhanced fluidity due to a self-exothermic property and increased plasticity.

The extruder main bodies 12, 14 and 16 each have the same structure as in a conventional system.

Next, an unvulcanized rubber member 19 formed by extrusion with the unvulcanized rubber extruding apparatus 10 will be described with reference to FIG. 3.

Figure 3:
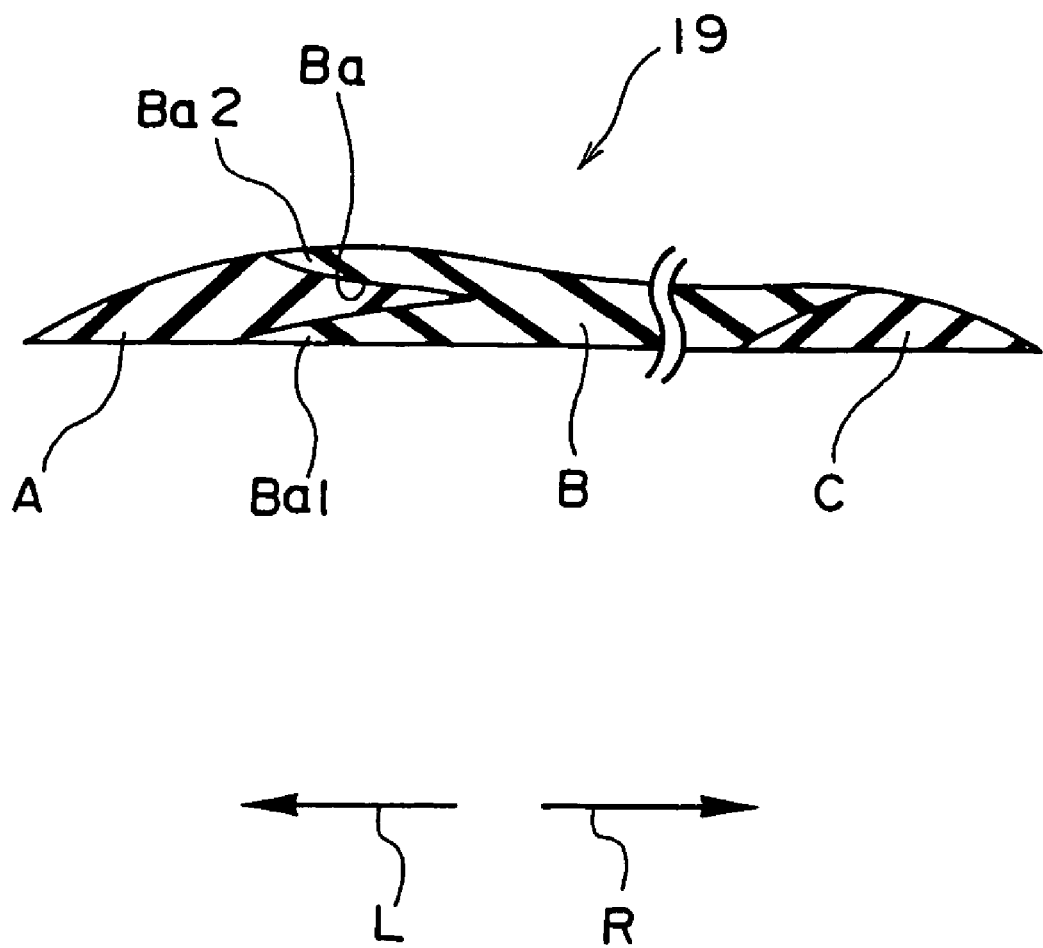
FIG. 3 is a cross sectional view of an unvulcanized rubber member formed by extrusion by the unvulcanized rubber extruding apparatus.

As shown in the cross sectional view of FIG. 3, an unvulcanized rubber member 19 is comprised of the three kinds of unvulcanized rubber, that is, the unvulcanized rubber A for forming a rubber chafer, the unvulcanized rubber B for forming a side-wall rubber layer, and the unvulcanized rubber C for a cushion rubber layer to be disposed at an inner side of a tread at a position near a tire shoulder. The unvulcanized rubber member 19 is formed by extrusion so as to become wide in a horizontal direction, that is, in the direction indicated by arrows L and R.

In the unvulcanized rubber member 19, a substantially V-shaped groove portion Ba is provided at an end of the unvulcanized rubber B (the side-wall rubber layer) in the direction indicated by arrow L. At the end of the unvulcanized rubber B, a lower portion of the groove portion Ba is formed as an inner portion Ba1 along an inner surface of a carcass of a product tire, and an upper portion of the groove portion Ba is formed as an outer portion Ba2 along an outer wall surface of the tire.

The inner portion Ba1 and the outer portion Ba2 are each formed so as to be tapered with the thickness thereof being gradually decreased toward the end in the direction indicated by arrow L.

The unvulcanized rubber A (rubber chafer) extends in the widthwise direction in the same manner as the unvulcanized rubber B (side-wall rubber layer), that is, in the direction indicated by arrows L and R, and is formed in a tapered manner so that the thickness thereof gradually decreases from a thick central portion to both ends in the widthwise direction.

The end of the unvulcanized rubber A (rubber chafer) at the side of the unvulcanized rubber B (side-wall rubber layer) is covered such that the upper surface thereof is in contact with the outer portion Ba2 and the lower surface thereof is in contact with the inner portion Ba1.

The other end of the unvulcanized rubber B (side-wall rubber layer) in the direction indicated by arrow R is formed in a tapered manner so that the thickness thereof gradually decreases toward the end.

The unvulcanized rubber C (cushion rubber layer) is disposed at the end of the unvulcanized rubber B (side-wall rubber layer) in the direction indicated by arrow R. The unvulcanized rubber C may not necessarily be required, depending on the type of tire.

The unvulcanized rubber C (cushion rubber layer) is formed in a tapered manner so that the thickness thereof gradually decreases from the central portion to the both ends thereof in the widthwise direction. A portion of the unvulcanized rubber C in the direction indicated by arrow L is covered by the other end of the unvulcanized rubber B (side-wall rubber layer) from an upper side.

Next, the unvulcanized rubber extruding apparatus 10 will be described in detail.

Figure 4:
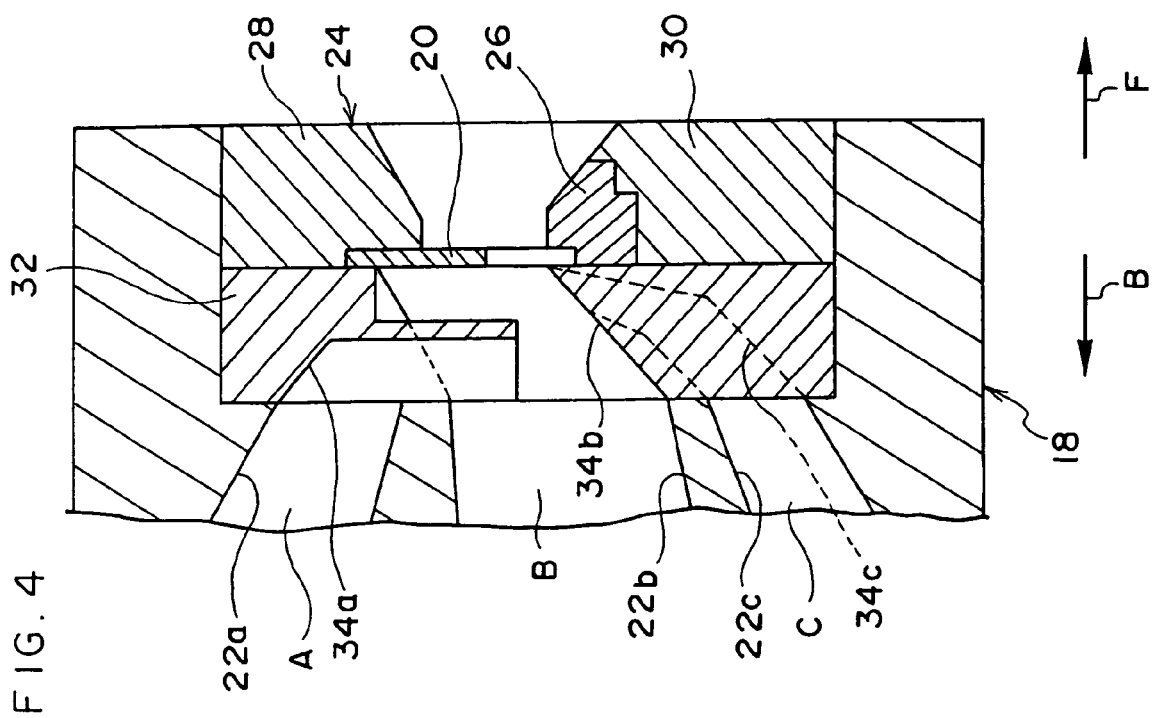
FIG. 4 is a longitudinal cross sectional view of an extrusion head.
Figure 5:
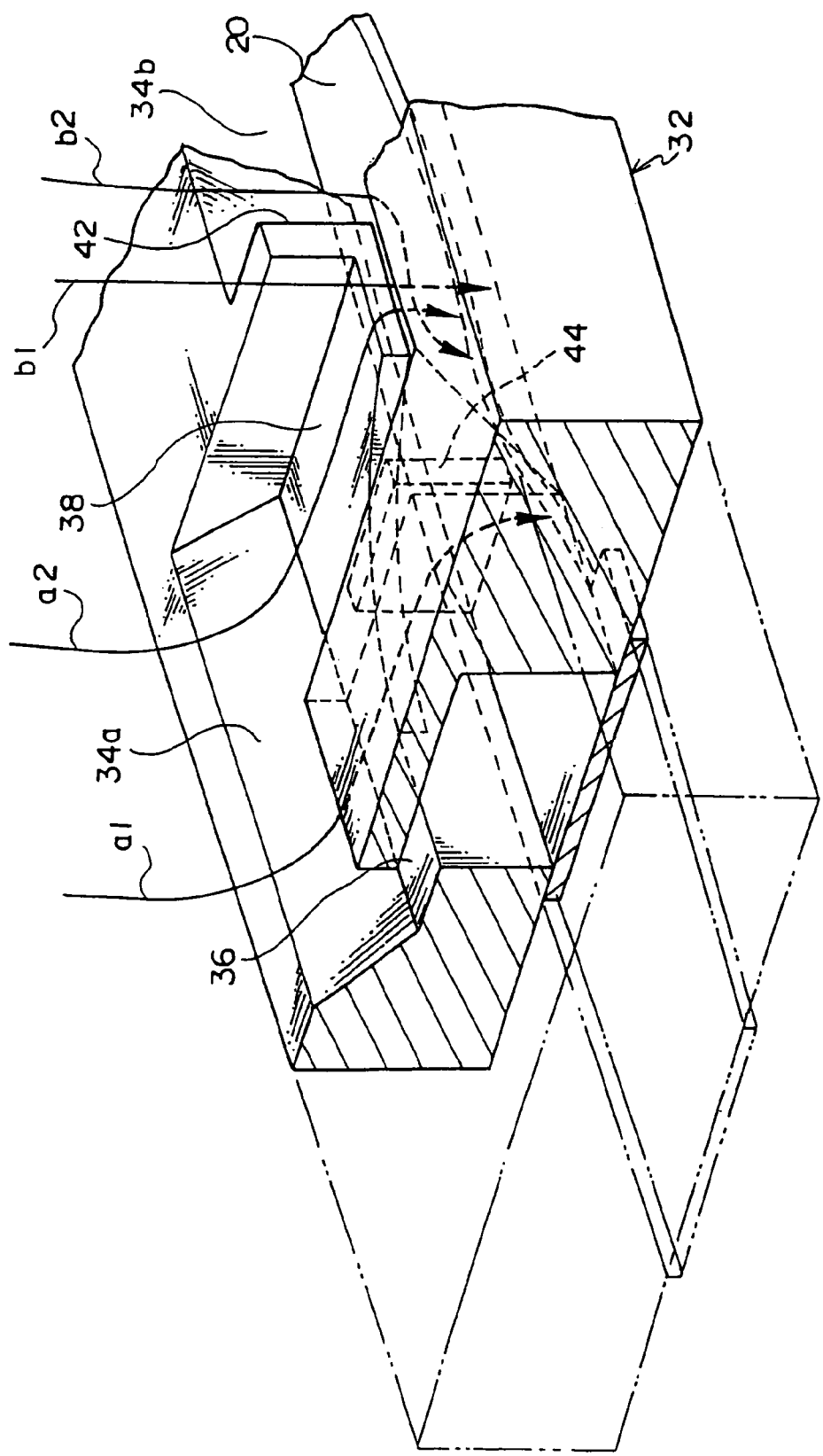
FIG. 5 is a perspective view showing a portion of the passage-forming die.
Figure 7:
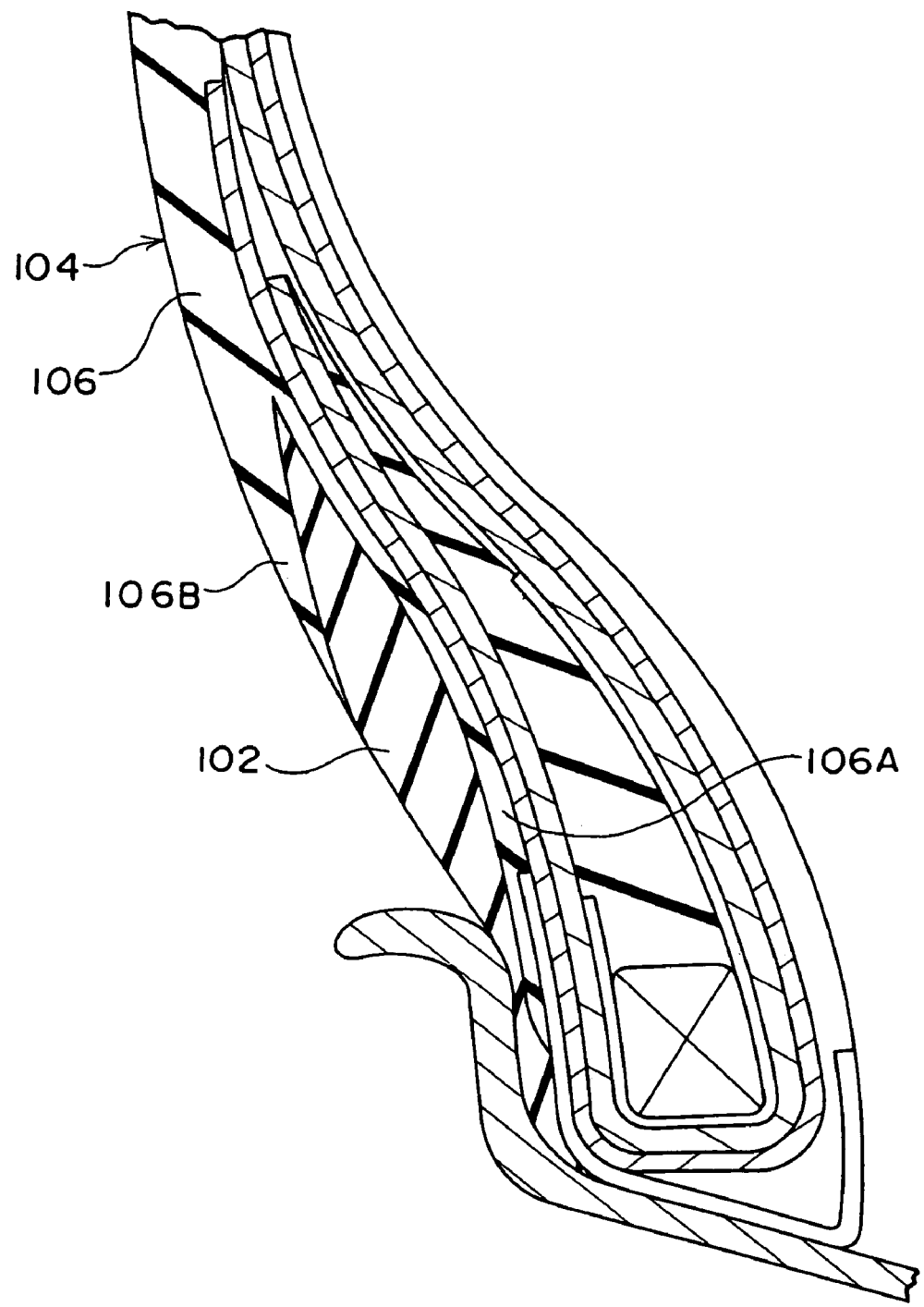
FIG. 7 is a cross sectional view showing a bead portion of a conventional pneumatic tire.
Figure 8:
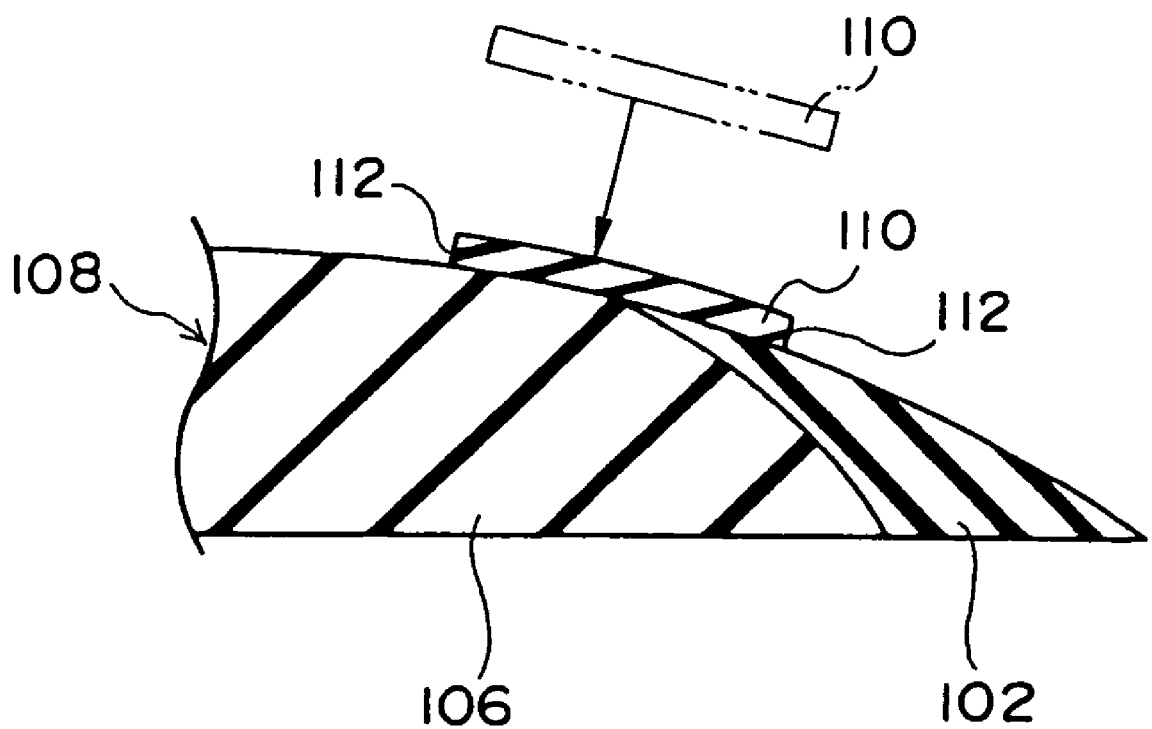
FIG. 8 is a cross sectional view of a conventional unvulcanized rubber member.

As shown in FIG. 4, the extrusion head 18 includes an extrusion die plate (hereinafter referred to as "die plate") 20 positioned at a front side in a direction in which the unvulcanized rubbers A, B and C are extruded, and also includes passages 22a, 22b and 22c for the unvulcanized rubbers A, B and C, which are directed toward the die plate 20 from extrusion orifices of the extruder main bodies 12, 14 and 16. Further, the extrusion head 18 detachably accommodates an unvulcanized rubber member-forming device 24 for forming the unvulcanized rubber member 19, in which the unvulcanized rubbers A, B and C each have a predetermined cross sectional configuration, at a position between ends of the passages 22a, 22b and 22c and the front side of the die plate 20.

The unvulcanized rubber member 19 is extruded from the die plate 20 in the direction indicated by arrow F in FIG. 4.

The unvulcanized rubber member-forming device 24 has a back die 26 which serves to form a bottom portion of an outer contour of the die plate 20 to make a pair together with the die plate 20, a die holder 28 for holding and fixing the die plate 20 to the extrusion head 18, and a back die holder 30 for holding and fixing the back die 26 to the extrusion head 18.

In the unvulcanized rubber member-forming device 24, a passage-forming die 32 is provided between the ends of the passages 22a, 22b and 22c of the extrusion head 18 and the die plate 20.

As shown in FIGS. 1A, 1B, 5, 6A, 6B and 6C, the passage-forming die 32 includes, at a central portion thereof, a passage 34b through which the unvulcanized rubber B flows, and also includes a passage 34a through which the unvulcanized rubber A flows, at a side in the direction indicated by arrow L, and a passage 34c through which the unvulcanized rubber C flows, at a side in the direction indicated by arrow R.

The passage 34a and the passage 34b are connected to each other.

The passage 34a has a stepped portion 36 at a side in the direction indicated by arrow U.

A first weir 38, which serves as a flow dividing mechanism, is provided at an end of the stepped portion 36 in the direction indicated by arrow D (that is, a portion at which the passage 34a and the passage 34b are connected) so as to protrude toward the passage 34b in the direction indicated by arrow D.

Figures 1A, 1B:
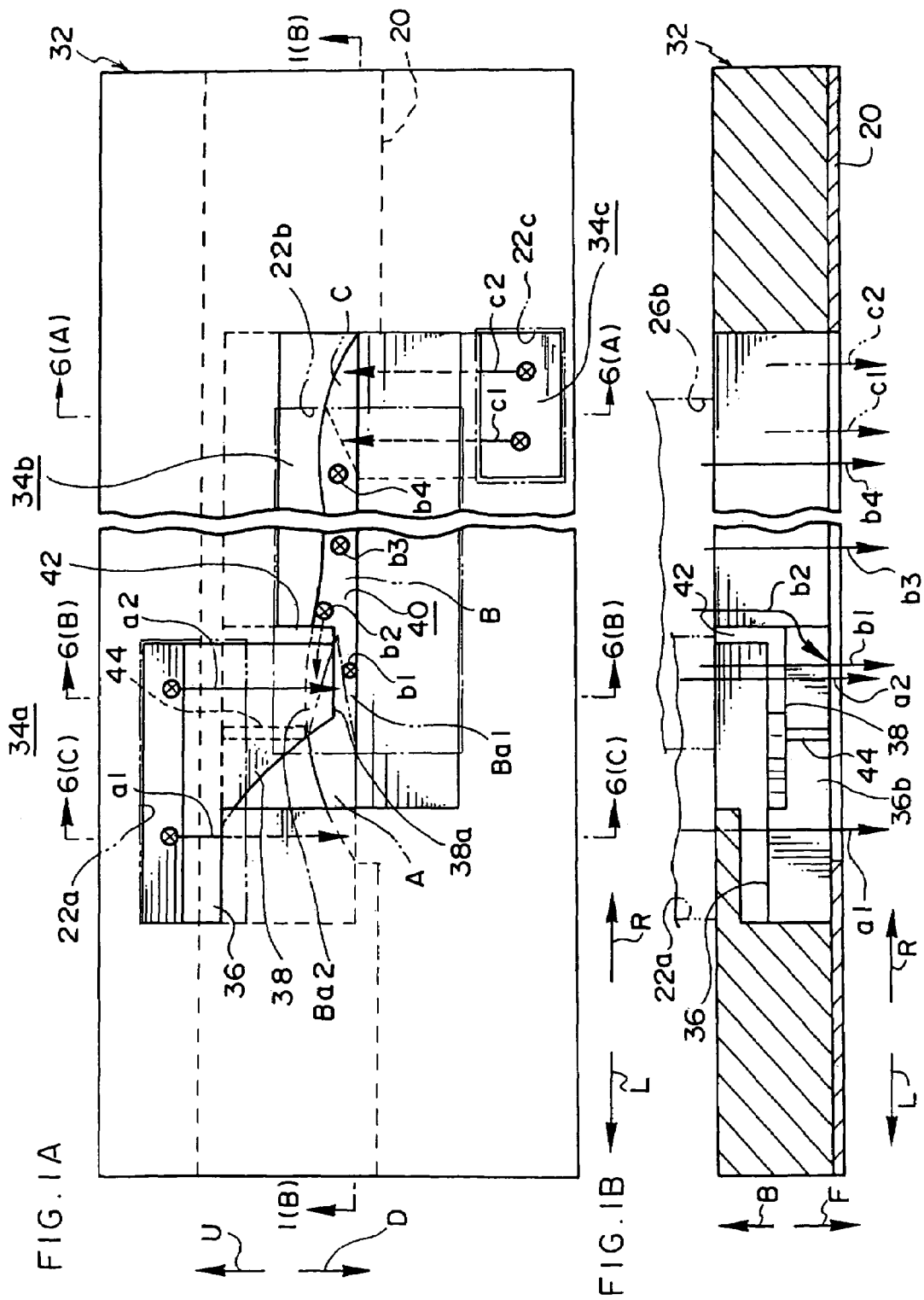
FIG. 1A is a back view of a passage-forming die as seen from a side of extruders.
FIG. 1B is a cross sectional view taken along the line 1(B)-1(B) of the passage-forming die shown in FIG. 1A.

As shown in FIG. 1A, the dimension of the first weir 38 protruding toward the passage 34b is gradually made shorter from a substantially intermediate portion thereof in the direction indicated by arrow L.

An end 38a of the first weir 38 in the direction indicated by arrow D is disposed at a substantially intermediate position with respect to an opening portion 40 formed by the die plate 20 in a direction corresponding to thickness of the rubber extruded member. As shown in FIG. 6B, the end 38a of the first weir 38 extends to a position near an intermediate portion of the cross section of the passage 34b in a vertical direction of the die (that is, in the directions indicated by arrows U and D).

A partition wall 42 is integrally formed with the end of the first weir 38 in the direction indicated by arrow R so as to protrude toward the passage 34b.

The partition wall 42 is formed upright from the first weir 38 so as to reach the extrusion head 18 (in the direction indicated by arrow B).

A second weir 44 is provided between the first weir 38 and the die plate 20 so as to protrude toward the passage 34b from a side surface 36b of the stepped portion 36 located at a side in the direction indicated by arrow F.

The end of the second weir 44 reaches the opening portion of the die plate 20.

The passage 22a of the extrusion head 18 is opened at a position which faces the stepped portion 36, and the passage 22b is opened at a central portion of the passage 34b in the widthwise direction.

Further, an opening of the passage 34c at the side of the die plate 20 is located in the vicinity of an end of the passage 22b at the side in the direction indicated by arrow R.

Next, the operation of the unvulcanized rubber extruding apparatus 10 will be described.

First, the unvulcanized rubbers A, B and C are delivered by the extruder main bodies 12, 14 and 16, respectively, toward the extrusion head 18. The unvulcanized rubber A is fed into the passage 34a via the passage 22a, the unvulcanized rubber B is fed into the passage 34b via the passage 22b, and the unvulcanized rubber C is fed into the passage 34c via the passage 22c.

In the passage-forming die 32, the unvulcanized rubber A flows toward the die plate 20 as indicated by arrows a1 and a2, the unvulcanized rubber B flows toward the die plate 20 as indicated by arrows b1, b2, b3 and b4, and the unvulcanized rubber C flows toward the die plate 20 as indicated by arrows c1 and c2.

As a result, the unvulcanized rubber A is pushed out from the die plate 20 at the side in the direction indicated by arrow L, and the vulcanized rubber C is pushed out from the die plate 20 at the side in the direction indicated by arrow R. The unvulcanized rubber B is pushed out from the central portion of the die plate 20.

Specifically, the flow of unvulcanized rubber A is partially changed by the first weir 38 in the direction indicated by arrow D so as to ride across the first weir 38 as shown by the arrow a2, and thereafter, the unvulcanized rubber A flows toward the die plate 20 in the direction indicated by arrow F.

Further, as shown in FIGS. 1A and 1B, at the die plate 20 side of the first weir 38 (in the direction indicated by arrow F), a portion of the unvulcanized rubber B flows in the direction indicated by arrow L as indicated by arrow b2 at the side of the direction indicated by arrow U (at the side of the stepped portion 36) in which the unvulcanized rubber A flows as indicated by arrow a2. Moreover, at the side of the direction indicated by arrow D (at the side of the end 38a) in which the unvulcanized rubber A flows as indicated by arrow a2, a portion of the unvulcanized rubber B flows toward the die plate 20 in the direction of arrow F in such a manner as indicated by arrow b1.

In other words, as shown by the cross sectional view of FIG. 3, in the unvulcanized rubber member 19 formed by extrusion, the flow of the unvulcanized rubber B indicated by arrow b2 forms the outer portion Ba2, and the flow of the unvulcanized rubber B indicated by arrow b1 forms the inner portion Ba1.

The end of the outer portion Ba2 of the unvulcanized rubber B can be changed by the position of the second weir 44 which changes the direction in which the unvulcanized rubber B flows as indicated by arrow b2 (in the directions indicated by arrows L and R).

Further, the border line between the unvulcanized rubber A and the unvulcanized rubber B in the unvulcanized rubber member 19 can also be changed by extrusion pressure of each unvulcanized rubber.

Thus, the use of the unvulcanized rubber extruding apparatus 10 of the present embodiment allows formation of the unvulcanized rubber member 19 shown in the cross section of FIG. 3 in one process. Further, unlike conventional, the unvulcanized rubber member 19 does not have a stepped portion formed by sticking a rubber sheet onto the surface thereof. Therefore, there is no possibility of bare occurring.

As described above, the method and apparatus for extruding unvulcanized rubber according to the present invention has an excellent effect in that the number of processes for manufacturing tires is not increased and an unvulcanized rubber member from which a high quality tire can be obtained can be effectively produced.

What is claimed is:

1. A method for extruding unvulcanized rubber, in which an extruded rubber member is formed by extrusion by an extruding apparatus having a flow dividing mechanism that includes a first weir disposed at an upstream side of a die plate including an opening and apart from the die plate, and protruding from a second passage side of a second passage toward a first passage in a direction perpendicular to a direction in which a first unvulcanized rubber passes, and a partition wall extending substantially perpendicular from the first weir in a direction away from the die plate, one end portion of the first weir being connected to a passage-forming die and the other end portion thereof being disposed at a portion substantially corresponding to a widthwise intermediate portion of the opening of the die plate, the widthwise direction corresponding to a direction in which the first weir protrudes, the extruded rubber member having a cross sectional configuration in which a portion of a second unvulcanized rubber intrudes into the first unvulcanized rubber and a portion of the first unvulcanized rubber is disposed at both sides of the intruded second unvulcanized rubber in a direction intersecting a direction in which the second unvulcanized rubber intrudes, said method comprising the steps of:

dividing a portion of the first unvulcanized rubber flowing through the first passage by the flow dividing mechanism into two flows at an upstream side of the die plate including the opening in the extruding apparatus;

allowing a portion of the second unvulcanized rubber flowing through the second passage to intrude in between the two flows into which the portion of the first unvulcanized rubber is divided; and extruding, from the opening of the die plate, an extruded rubber member in which the first unvulcanized rubber and the second unvulcanized rubber are integrated with each other.

2. The method of claim 1, wherein the first unvulcanized rubber and the second unvulcanized rubber are caused to intersect with each other by allowing the second unvulcanized rubber to pass over the first weir.

3. The method of claim 2, wherein the flow dividing mechanism includes a second weir extending from the first weir to the die plate, and the position of one of leading ends of two divided flows of the first unvulcanized rubber disposed at both sides of the second unvulcanized rubber is changed by the position of the second weir.

4. The method of claim 2, wherein a border line between the first unvulcanized rubber and the second unvulcanized rubber is changed by extrusion pressures of the first unvulcanized rubber and second unvulcanized rubber.

5. The method of claim 2, further comprising a step of:
causing a portion of a third unvulcanized rubber to intrude into the first unvulcanized rubber, and an extruded rubber member having a region in which the first unvulcanized rubber and the third unvulcanized rubber are integrated with each other is extruded from the opening of the die plate.

6. The method of claim 5, wherein the third unvulcanized rubber intrudes into the first unvulcanized rubber at a side opposite to that at which the second unvulcanized rubber is disposed.

* * * * *